US005689419A

United States Patent [19]
Massat

[11] Patent Number: 5,689,419
[45] Date of Patent: Nov. 18, 1997

[54] APPARATUS INCLUDING COMPUTER CONTROL AND VOICE REPETITION OF DIGITAL SETTING MESSAGES

[75] Inventor: Jean-Claude Massat, Tournefeuille, France

[73] Assignee: Intertechnique, Plaisir, France

[21] Appl. No.: 371,700

[22] Filed: Jan. 12, 1995

[30] Foreign Application Priority Data

Jan. 12, 1994 [FR] France .................................. 94 00270

[51] Int. Cl.⁶ .................................................. G06F 17/21
[52] U.S. Cl. .............................. 364/424.06; 364/424.012; 340/945
[58] Field of Search ...................... 364/424.012, 424.034, 364/424.04, 424.06; 340/438, 439, 945, 973, 517, 519, 521

[56] References Cited

U.S. PATENT DOCUMENTS 4,267,147  5/1981  Harshaw et al. .................... 364/424.06
4,635,030  1/1987  Rauch .................................. 364/424.06
4,970,683  11/1990  Harshaw et al. .................... 364/424.06
4,970,973  11/1990  Ueda .................................. 364/710.01
5,077,671  12/1991  Leslie et al. ....................... 364/424.04
5,450,323  9/1995  Maupillier et al. ................. 364/424.06
5,454,074  9/1995  Hartel et al. ....................... 364/424.06

FOREIGN PATENT DOCUMENTS 0138776  8/1984  European Pat. Off. .

*Primary Examiner*—Gary Chin
*Attorney, Agent, or Firm*—Larson and Taylor

[57] ABSTRACT

The control apparatus is suitable for use on airplanes. It has a digital computer, order-issuing devices for issuing settings in the form of digital messages including data plus a label number identifying the message in a standardized format. Actuators implement the settings under the control of the computer. The apparatus also has decoders which decode the digital messages issued by the order-issuing devices, typically in ARINC form, and a voice synthetizer provides a voice announcement specifying in the clear the setting as actually issued.

1 Claim, 4 Drawing Sheets

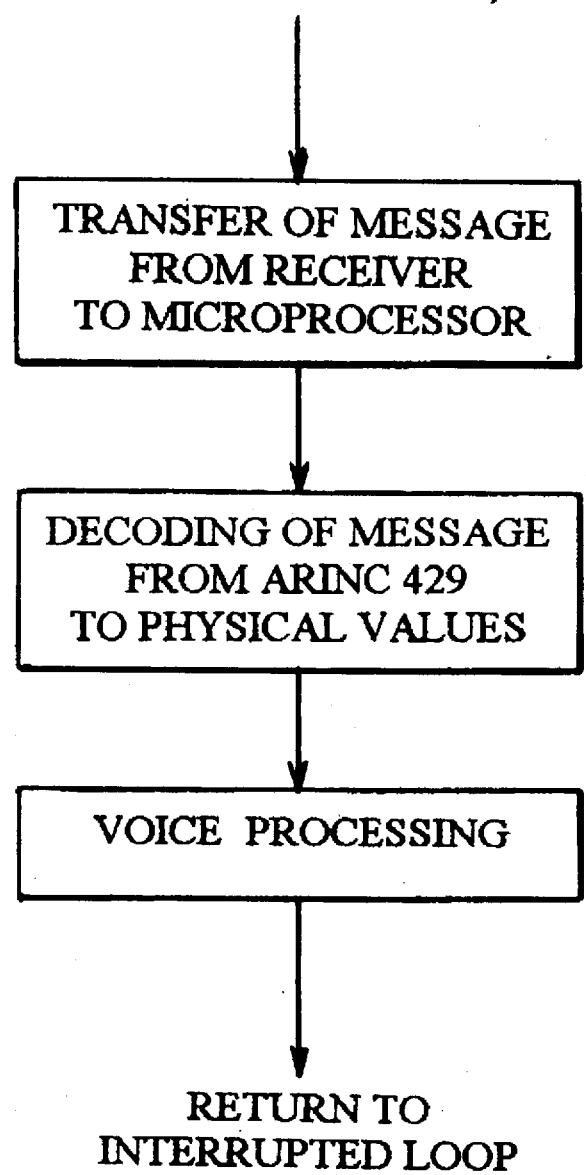

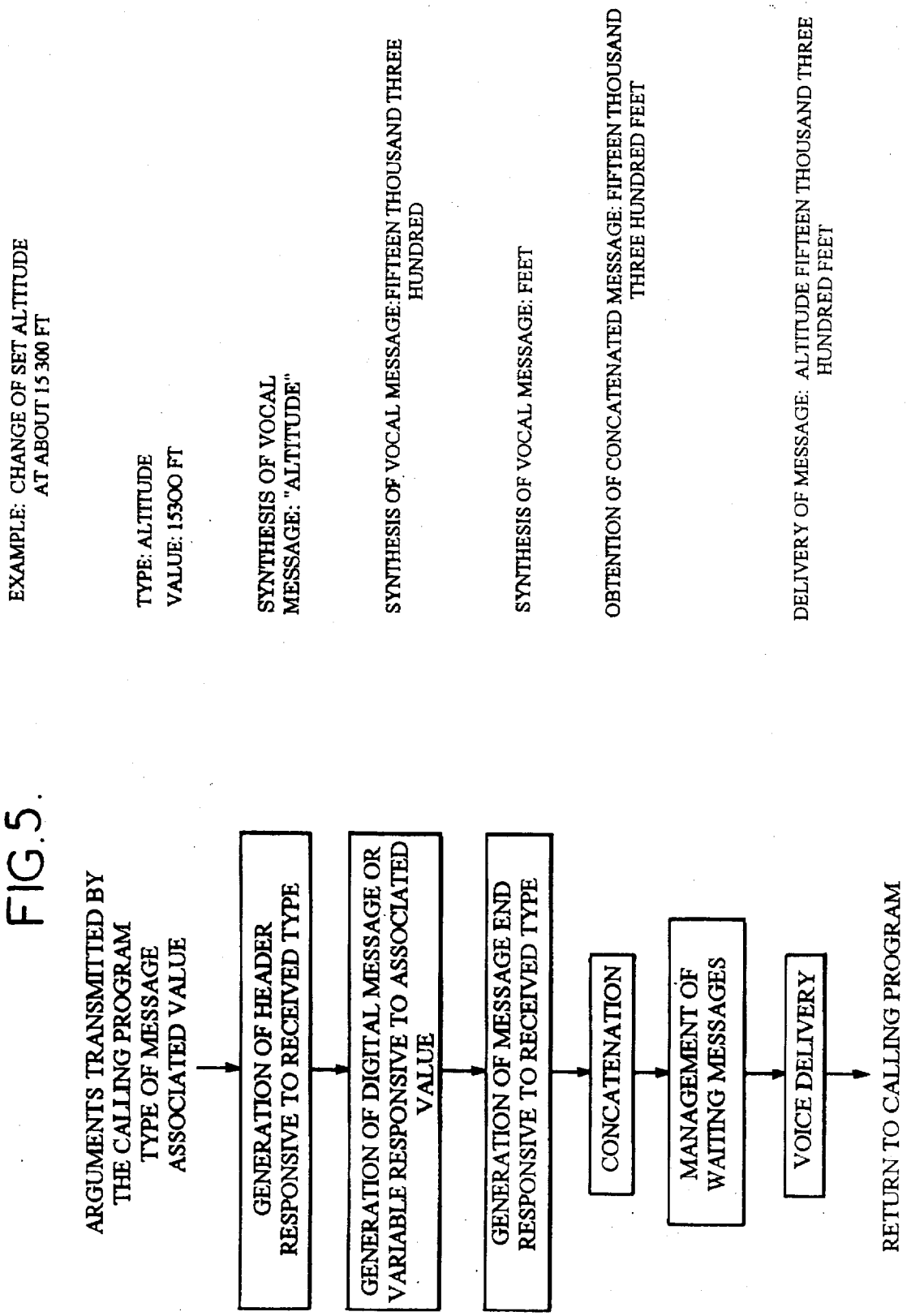

APPARATUS INCLUDING COMPUTER CONTROL AND VOICE REPETITION OF DIGITAL SETTING MESSAGES

BACKGROUND OF THE INVENTION

The present invention relates to control apparatus of the type including at least one digital computer, order-issuing devices for issuing settings in the form of digital messages that include data plus a header identifying the type of the message, the messages being in a standardized format, and actuators for executing the settings under the control of the computer.

Conventionally, the settings given by personnel to a control panel are repeated on an indicator making it possible to verify that the order as given is indeed the same as the order intended. On airplanes, for safety reasons, international procedures currently in force further require each crew member to specify orally each action undertaken, and in particular any change of a setting as applied to the control panel, so as to inform the other pilot and for cross-checking purposes.

In many cases, repetition in purely visual form has been found to be inadequate. The requirements that a pilot should state out loud each action undertaken is not always complied with, and in addition, the person speaking may make a mistake when stating the maneuver being performed.

SUMMARY OF THE INVENTION

It is an object of the present invention to provide apparatus of the above-defined type, that is particularly suitable for use in piloting airliners, and that makes it possible to improve the safety of such repetition. To this end, the invention proposes apparatus that also includes means for decoding the digital messages issued by the order-issuing devices, and voice synthesis means for providing a voice announcement specifying in plain language the setting as actually issued.

Such apparatus is quite different from alarm or warning systems that are designed, in the event of a particular abnormal situation arising, to issue prerecorded messages taken from a catalog of possible situations (car door not closed, temperature exceeded in a thermal system, etc.). Under such circumstances, physical parameters are merely monitored. In contrast, the invention takes every setting message into account and utters it in voice form and in plain language, even before it has been fully executed.

The present invention is particularly advantageous when the apparatus includes a serial bus or lines providing connection between the control panel(s) and the computer(s) by making use of messages in a standardized format. In particular, the invention is particularly simple to implement in apparatuses that make use of the ISO standardized RS232 or RS422 serial buses or of the ARINC 429, the ARINC 629, the MIL-STD 1553, and the Digibus type buses as are commonly used in aviation.

The apparatus may be designed not only to repeat settings that are issued in standardized digital form, but also to repeat additional on/off type orders, and even information provided by analog devices. Analog messages may be converted into digital form prior to being applied to the computer and decoded and being applied to the synthesis means. They may as well be applied directly in analog form to the computer. Then initial analog to digital conversion is required at the input of the computer and another conversion is required in the voice synthesis means.

The first solution is the most reliable since it guarantees that the information received by the decoder of the voice synthetizer means is identical to that used by the computer. However if that solution is applied to an existing system it requires modifications to be performed to the computer. Under such circumstances, it is preferable to adopt the second solution even though it does introduce the risk of possible divergence of the least significant bit in the digitized versions.

The invention will be better understood on reading the following description of a particular embodiment given by way of example.

BRIEF DESCRIPTION OF THE DRAWINGS

FIG. 4 is a flow sheet identifying the successive steps caused by receipt of an ARINC 429 message; and FIG. 5 is a flow sheet indicating successive steps of voice processing of a message.

DETAILED DESCRIPTION

Figure 1:
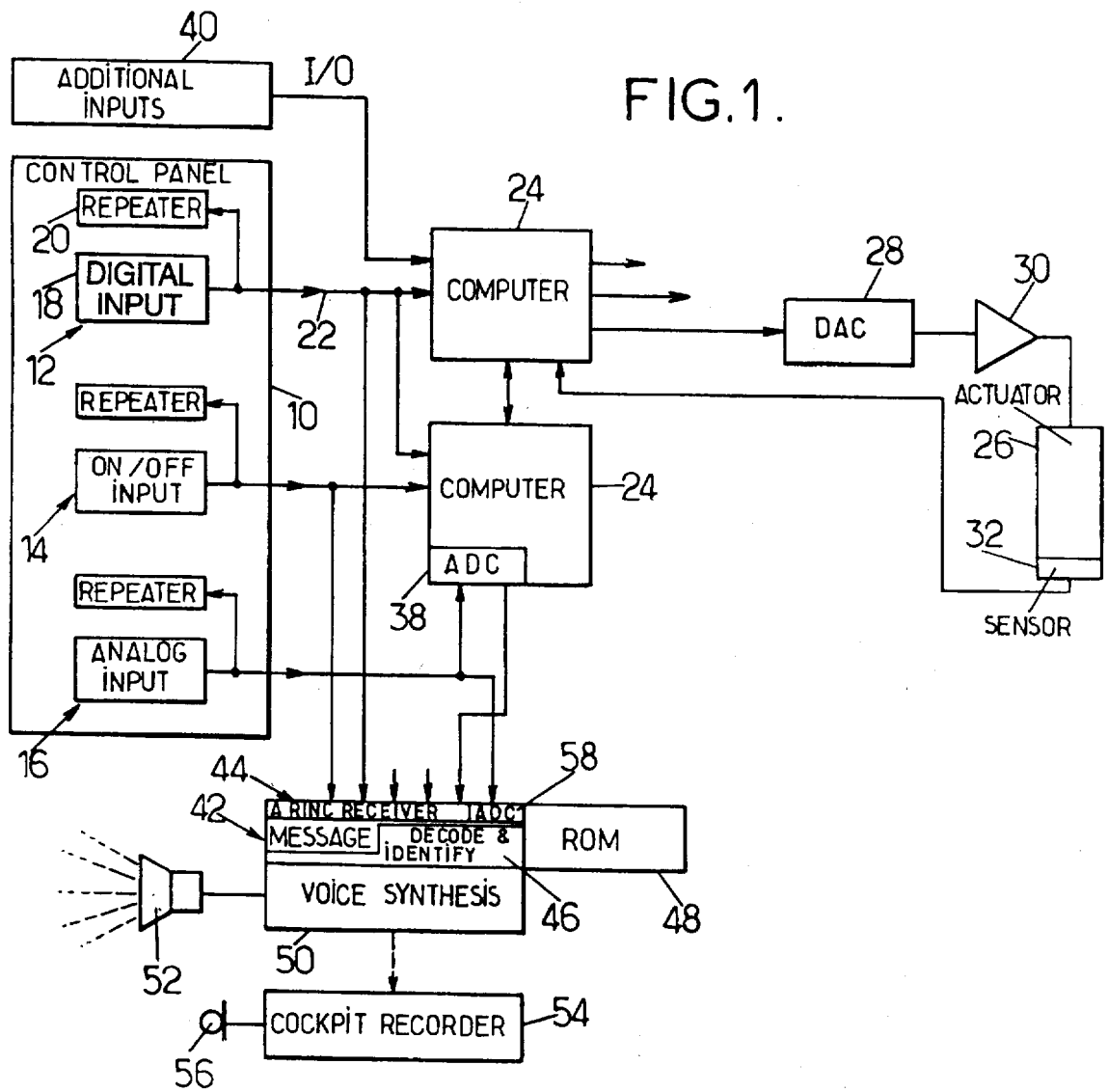
FIG. 1 is a block diagram of the apparatus.

The highly simplified diagram of FIG. 1 shows a disposition as used, for example, for the link between the order-issuing devices of the control panel of the automatic pilot of an airplane and its computers, there being two computers in the example shown. The control panel 10 may, in particular, include order-issuing devices 12 for issuing digital messages directly, order-issuing devices 14 designed to issue messages representative of on/off settings, and order-issuing devices 16 that provide analog output signals. Conventionally, an order-issuing device includes means 18 for input and confirmation of a setting, and a repeater 20 that displays the setting that has been given, and once it has been confirmed, in the form of a visual indication. In the context of an automatic pilot, for example, the order-issuing devices 12 serve to display settings such as: speed, heading, altitude, attitude, rate of climb or of descent, angle of climb or of descent, etc. Once confirmed, each setting is conveyed to the automatic pilot by a bus 22, e.g. an ARINC 429 bus. Each setting is taken into account by the or each computer 24 which issues an appropriate order to one or more actuators 26 via a digital-to-analog converter 28 and an amplifier 30. Return signals indicating that orders have been executed may be provided by a sensor 32 on the actuator 26.

Figure 2:
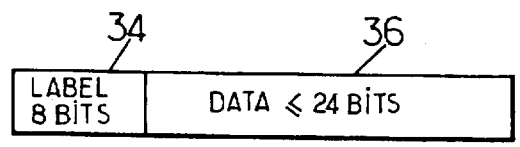
FIG. 2 is a diagram showing the structure of a digital message concerning a setting and coming from an issuing device.

The setting messages may, in particular, have the structure that is shown diagrammatically in FIG. 2, comprising a label word 34 constituted by eight binary digits in the ARINC 429 standard, and by a working or "data" portion 36 that includes no more than twenty-four binary digits in that system. The label 34 identifies the type of data situated in the portion 36 and it enables the receiving computers to select the appropriate processing. The label 34 is recognized on the basis of a decoding table contained in the computer memory.

Examples of labels are as follows:

| | |
|---|---|
| 023 | Selected heading |
| 025 | Selected altitude |
| 022 | Selected mach |

| | |
|---|---|
| 127 | Selected landing altitude |
| 104 | Selected vertical speed |
| 137 | Selected thrust reverser position |

In the particular case of an ARINC 429 message, the label constitutes an octal-encoded field that informs the computer about the meaning of the 24 other bits. The label indicates, for example, whether the last 24 bits represent the relative speed of the airplane, the quantity of fuel, the altitude setting, etc . . . In such a message, there is no notion of an address, whether for receiving or for transmitting purposes. This is made possible because an ARINC bus has only one transmitter, which knows what it transmits. There may be a plurality of receiving computers. The computers decode calls and identify those messages in the data stream that are intended for them.

When the order-issuing device, e.g. device 16, is designed to deliver a setting in analog form, it is input to one or more of the computers 24 via an analog-to-digital converter 38.

Finally, when an order-issuing device provides an on/off type of setting, e.g. the device 14 in FIG. 1, then the "data" portion of the message can be a single control bit, optionally associated with additional bits for checking purposes.

The computers may also have other functions, for example they may receive settings from additional order-issuing devices 40 that also provide messages in an ARINC 429 format. Such devices may, for example, control lowering or raising of the landing gear, switching on cabin pressurization, etc.

In accordance with the invention, the apparatus further includes a repeater system that utters in voice form and in plain language any setting that has been given. As shown in FIG. 1, the repeater system comprises a unit 42 whose input element is constituted by an ARINC receiver 44 that is connected to the digital message transfer buses and lines and also to the outputs of the analog-to-digital converters for converting settings given in the form of analog messages. The ARINC receivers may be of standard type; for instance they may be multichannel receivers ARINC 429 (RTA) EF 4442 available from Thomson-EFCIS, Velizy, France. They provide the shaped signal to means 46 for digital message decoding and for message identification. These means are connected to storage means 48 containing a correspondence table defining the nature of the controlled parameter and the value given to said parameter.

In general, the storage means 48 will be a read-only memory (ROM). However, it could alternatively be constituted by read/write memories and/or by memories in which data can be remotely loaded.

On the basis of the correspondence table, the means 46 actuate voice synthesis means 50 enabling a message to be delivered to the cabin loudspeaker 52. Such a message can be made up of lengths that have been stored, or it can be made up by synthesis proper, with concatenation of phonemes. For example, the voice message or announcement may be made up of three successive elements:

"descent angle"

"three"

"degrees"

or otherwise:

"defrosting"

"half"

"power".

A conventional cockpit recorder 54 may be provided. It then serves to keep a record of all voice indications in the cockpit which are picked up by a microphone 56, whether coming from the loudspeaker 52, or from the crew members. The recorder may as well be designed to receive the output from the voice synthesizer 50 directly in electrical form.

The system may include further means to issue warning messages or indications whenever it appears that a given setting is incompatible with the conditions of other parameters, for example simultaneously lowering the landing gear while maintaining the engines on full power.

Figure 3:
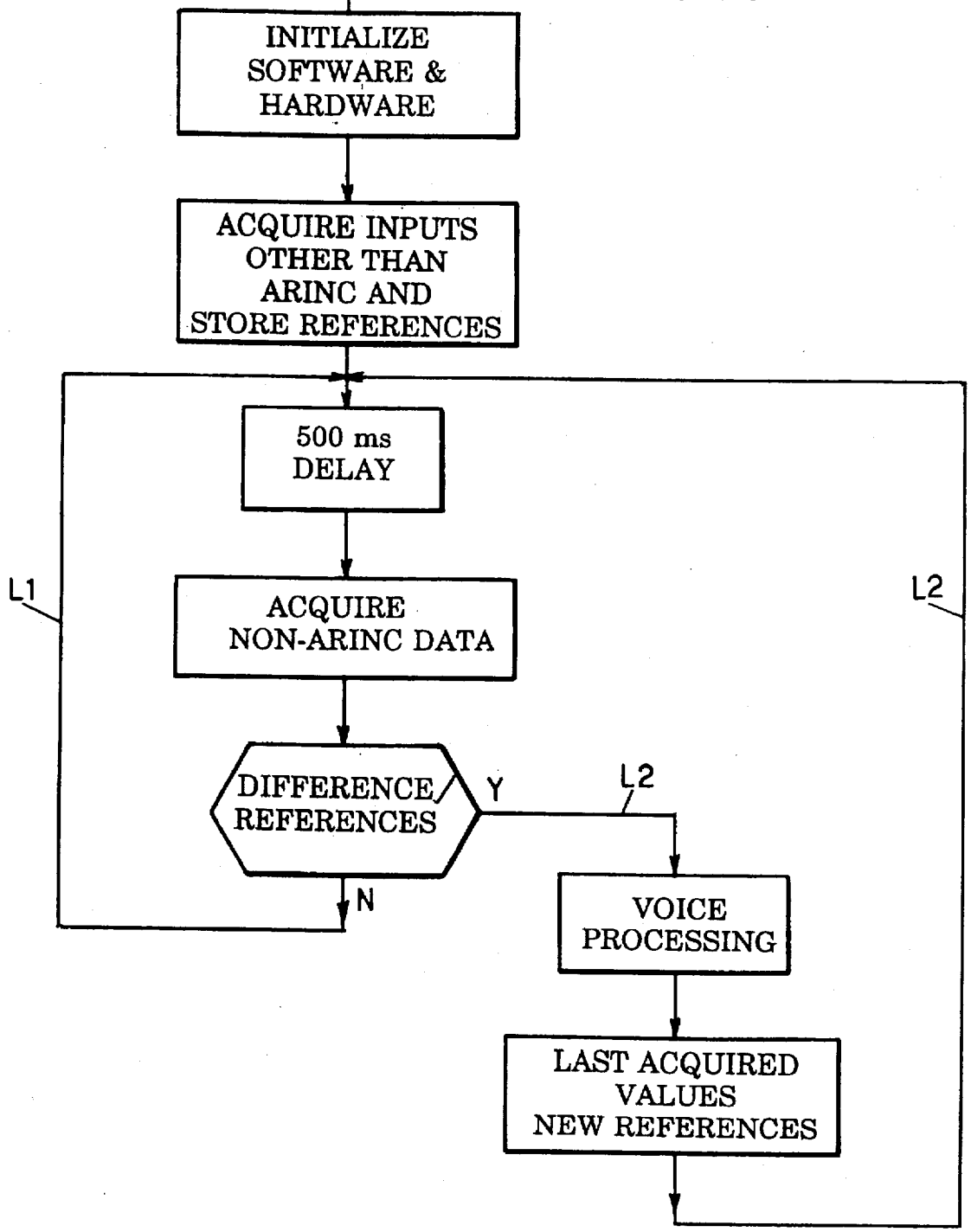
FIG. 3 is a flow sheet indicating the operational steps carried out by an apparatus of the type shown in FIG. 1.

Referring to FIG. 3, a typical flow sheet is given by way of example. It indicates how inputs other than in ARINC form are taken into account in acquisition and processing loops identified as L1 and L2. The delay introduced before acquisition of an actual value may be other than 500 ms. The comparison between analog values is so made that no difference is indicated if the actual input differs from the preceding value by an amount lesser than an amount selected to take account of noise and precision of analog-to-digital conversion.

As soon as an ARINC receiver receives an ARINC 429 message and identifies its label as indicating a message to be processed, it generates an interrupt order toward the microprocessor. There occurs an interrupt of loop L1 or L2 and processing takes place as indicated on FIG. 4. Voice processing may take place as indicated on FIG. 5.

I claim:

1. Control apparatus for an aircraft having an automatic pilot comprising:

at least one digital computer, a plurality of order-issuing devices carried by a control panel of the automatic pilot and provided with means for manually inputting settings and for issuing the settings in the form of digital messages each comprising a data portion and a label word identifying a nature of the digital message, the messages being in standardized ARINC format;

a plurality of actuators for executing the settings under the control of said digital computer;

decoding means for decoding the digital messages issued by the order-issuing devices and providing decoded versions of said digital messages, said decoding means including storage means containing a correspondence table defining the nature of a controlled parameter and a meaning of the data portion from said label word, and defining a value of said controlled parameter from contents of said data portion; and voice synthesis means, connected to receive said decoded versions, for providing a voice announcement specifying, in plain language, any one of said settings as actually inputted responsive to inputting thereof into said order-issuing devices, said voice synthesis means forming said voice announcement by combining a plurality of language elements including an element indicating said value; and a cockpit sound recorder, whereby maneuvers displayed on the order-issuing devices of the control panel of the automatic pilot are recorded in voice form.

* * * * *